United States Patent [19]

Hutchinson, deceased et al.

[11] 4,164,471

[45] Aug. 14, 1979

[54] CONSTANT BOILING ADMIXTURES

[75] Inventors: William M. Hutchinson, deceased, late of Bartlesville, Okla.; by Florence M. Hutchinson, executrix, Claremore, Okla.

[73] Assignee: Phillips Petroleum Company, Bartlesville, Okla.

[21] Appl. No.: 865,141

[22] Filed: Dec. 28, 1977

Related U.S. Application Data

[62] Division of Ser. No. 783,243, Mar. 31, 1977, Pat. No. 4,097,398 and a division of Ser. No. 690,807, May 27, 1976, Pat. No. 4,039,465, which is a division of Ser. No. 602,353, Aug. 6, 1975, Pat. No. 4,024,086.

[51] Int. Cl.[2] .......................... C09K 3/30; C11D 7/50; C23G 5/02

[52] U.S. Cl. ........................................ 252/1; 252/172; 252/305; 252/364; 252/DIG. 9

[58] Field of Search ......... 252/364, 305, 172, DIG. 9, 252/1

[56] References Cited

U.S. PATENT DOCUMENTS

| | | | |
|---|---|---|---|
| 3,377,287 | 4/1968 | Kvalnes et al. | 260/653 X |
| 3,583,921 | 6/1971 | Healy et al. | 252/90 |
| 3,733,273 | 5/1973 | Munro | 252/67 X |

*Primary Examiner*—Richard D. Lovering

[57] ABSTRACT

Constant boiling binary admixtures are formed by 1,2-dichloro-1,1-difluoroethane (F-132B) with acetone, with methanol, and with ethanol; and a constant boiling ternary admixture is formed with diethyl ether and ethanol. Constant boiling binary admixtures are formed by 1,1,2-trifluoroethane (F-132) with octafluorocyclobutane, with 1,2-dichloro-1,1,2,2-tetrafluoroethane, with dichlorofluoromethane, with trichlorofluoromethane, with 1,1,2-trichloro-1,2,2-trifluoroethane, and with 1,1,1-trifluoro-2-chloroethane.

3 Claims, No Drawings

CONSTANT BOILING ADMIXTURES

This is a division of application Ser. No. 783,243, filed Mar. 31, 1977, now U.S. Pat. No. 4,097,398, issued June 27, 1978. Ser. No. 783,243 is a Divisional Application of Ser. No. 690,807, filed May 27, 1976, now U.S. Pat. No. 4,039,465, issued Aug. 2, 1977; which is a Divisional Application of Ser. No. 602,353, filed Aug. 6, 1975, now U.S. Pat. No. 4,024,086, issued May 17, 1977.

FIELD OF THE INVENTION

The invention relates to novel compositions of matter incorporating 1,2-dichloro-1,1-difluoroethane or 1,1,2-trifluoroethane.

BRIEF SUMMARY OF THE INVENTION

I have discovered that constant boiling binary admixtures are formed by 1,1-dichloro-1,1-difluoroethane (F-132B) with acetone, with methanol, and with ethanol; and that a ternary admixture is formed with diethyl ether and ethanol.

I have discovered that constant boiling binary admixtures are formed by 1,1,2-trifluoroethane (F-132) with octafluorocyclobutane (C-318), with 1,2-dichloro-1,1,2,2-tetrafluoroethane (F-114), with dichlorofluoromethane (F-21), with trichlorofluoromethane (F-11), with 1,1,2-trichloro-1,2,2-trifluoroethane (F-113), and with 1,1,1-trifluoro-2-chloroethane (F-133*a*).

These constant boiling admixtures exhibit the characteristics of azeotropes. The designation numbers "F-" and "C-" are standard designations applied to individual fluorocarbons by the industry. Boiling points given for the compositions were measured at atmospheric pressures prevailing at the time of measurement.

DETAILED DESCRIPTION OF THE INVENTION

With 1,2-dichloro-1,1-difluoroethane

The binary composition 1,2-dichloro-1,1-difluoroethane (F-132B) with acetone is characterized by a boiling point of about 56.4° C. at substantially atmospheric pressure (about 743 mm mercury). The relationship at this boiling point is about 55.6 weight percent, 1,2-dichloro-1,1-difluoroethane and correspondingly about 44.4 weight percent acetone. This constant boiling admixture exhibits the characteristics typical of an azeotrope. The composition is characterized as flammable. The composition is an excellent solvent for silicone greases. Silicone greases commonly are removed by refluxing acetone in equipment, but the extraction is slow and incomplete. This azeotrope rapidly removes the silicone polymer, leaving merely the dry silica filler. The composition also is useful as a flux cleaner for soldered electrical circuits.

The binary composition 1,2-dichloro-1,1-difluoroethane with methanol is characterized by a boiling point of about 42° C. at substantially atmospheric pressure (about 737–738 mm mercury). The weight relationship at this boiling point is about 93.4 weight percent of 1,2-dichloro-1,1-difluoroethane and correspondingly about 6.6 weight percent methanol. This constant boiling admixture exhibits the characteristics typical of an azeotrope. The composition is characterized as nonflammable. This composition is a good solvent, and is useful in dry cleaning, particularly for damp soils. The composition also is useful as a flux cleaner for soldered electrical circuits.

The binary composition 1,2-dichloro-1,1-difluoroethane with ethanol is characterized by a boiling point of about 45.6° C. at substantially atmospheric pressure (about 746 mm mercury). The weight relationship at this boiling point is about 97.7 weight percent 1,2-dichloro-1,1-difluoroethane and correspondingly about 2.3 weight percent ethanol. This composition exhibits the characteristics typical of an azeotrope. The composition is classified as nonflammable. The composition is an effective solvent, useful as a dry cleaning agent, particularly for moist soils. The composition also is useful as a flux cleaner for soldered electrical circuits.

The ternary composition of 1,2-dichloro-1,1-difluoroethane with diethyl ether plus ethanol is characterized by a boiling point of about 45.7° C. at substantially atmospheric pressure (about 737 mm mercury). The weight relationship is about 83.8 weight percent 1,2-dichloro-1,1-difluoroethane: 14.5 weight percent diethyl ether: 1.7 weight percent ethanol. This constant boiling admixture exhibits the characteristics typical of an azeotrope. The composition is classified as flammable. The composition is an excellent solvent, and finds usefulness as degreasing applications and the like.

With 1,1,2-trifluoroethane

The binary composition 1,1,2-trifluoroethane (F-143)with octafluorocyclobutane (C-318) is characterized by a boiling point of about 26° C. at substantially atmospheric pressure (about 741 mm mercury). The weight relationship at this boiling point is about 21.6 weight percent 1,1,2-trifluoroethane and correspondingly about 78.4 weight percent octafluorocyclobutane. The boiling point of F-143 alone is about 5.2° C. at about 740 mm mercury, and of C-318 is about −6° C. The extent of boiling point elevation of the novel azeotrope is quite unexpected. This composition exhibits the characteristics typical of an azeotrope. The composition is an effective dry cleaning agent, and a good grease solvent.

The binary composition 1,1,2-trifluoroethane with 1,2-dichloro-1,1,2,2-tetrafluoroethane (F-114) is characterized by a boiling point of about 30.2° C. at substantially atmospheric pressure (about 737–738 mm mercury). The weight relationship at this boiling point is about 41.6 weight percent 1,1,2-trifluoroethane and correspondingly about 58.4 weight percent 1,2-dichloro-1,1,2,2-tetrafluoroethane. The boiling point of F-143 is about 5.2° C., and of F-114 is about 3.6° C. The extent of boiling point elevation of the azeotrope is unexpected. The composition exhibits characteristics typical of an azeotrope. The composition is classified as nonflammable. The composition is an effective dry cleaning material, and grease solvent.

The binary composition 1,1,2-trifluoroethane with dichlorofluoromethane (F-21) is characterized by a boiling point of about 6.3° C. at substantially atmospheric pressure (about 739–740 (739.4) mm Hg). The weight relationship at this boiling point is about 59.5 weight percent 1,1,2-trifluoroethane and correspondingly about 40.5 weight percent dichlorofluoromethane. This constant boiling axmixture exhibits the characteristics typical of an azeotrope. The boiling point of F-143 is about 5.2° C., and of F-21 is about 8.9° C. The extent of boiling point elevation of the azeotrope is unexpected. The composition is classified as nonflammable. The composition is a good degreasing type solvent, and its boiling point characteristics are such that the composition also is useful as an efficient propellant for low pressure aerosol sprays.

The binary composition 1,1,2-trifluoroethane with trichlorofluoromethane (F-11) is characterized by a boiling point of about 31° C. at substantially atmospheric pressure (about 749–750 (749.8) mm Hg). The weight relationship at this boiling point is about 59.9 weight percent 1,1,2-trifluoroethane and correspondingly about 40.1 weight percent trichlorofluoromethane. This constant boiling admixture exhibits the characteristics typical of an azeotrope. The composition is classified as nonflammable. The composition is an effective degreasing solvent.

The binary composition 1,1,2-trifluoroethane with 1,1,2-trichloro-1,2,2-trifluoroethane (F-113) is characterized by a boiling point of about 38° C. at substantially atmospheric pressure (about 748 mm Hg). The weight relationship at this boiling point is about 89.5 weight percent 1,1,2-trifluoroethane and correspondingly about 10.5 weight percent 1,1,2-trichloro-1,2,2-trifluoroethane. This constant boiling admixture exhibits the characteristics typical of an azeotrope. The composition is classified as nonflammable. The composition is an effective degreasing solvent, useful particularly as a dry cleaning agent.

The binary composition 1,1,2-trifluoroethane with 1,1,1-trifluoro-2-chloroethane (F-133*a*) is characterized by a boiling point of about 40° C. at substantially atmospheric pressure (about 731–732 (731.1) mm Hg). The weight relationship at this boiling point is about 53.2 weight percent 1,1,2-trifluoroethane and correspondingly about 46.8 weight percent 1,1,1-trifluoro-2-chloroethane. This constant boiling admixture exhibits the characteristics typical of an azeotrope. The composition is classified as nonflammable. The composition is useful as a dry cleaning solvent.

Constant boiling admixtures are liquid mixtures of two or more substances which mixtures behave like a single substance in that the vapor produced by partial evaporation or distillation has the same composition as does the liquid, i.e., the admixtures distill without change in composition. Constant boiling compositions characterized as azeotropes exhibit either a maximum or minimum boiling point as compared with that of nonazeotropic mixtures of the same substances. It is not possible to predict what two or more substances will combine to form azeotropes, as the resultant mixture must exhibit non-ideal phase behavior in order for an azeotrope to form, and non-ideal phase behavior is unpredictable.

At differing pressures, the composition of a given azeotrope will vary, at least slightly, and changes in distillation pressures also change, at least slightly, the distillation temperatures. Thus, as azeotrope of A and B represents a unique type of relationship but with a variable composition depending upon temperature and/or pressure.

It is possible to fingerprint, in effect, a constant boiling admixture, which may appear under varying guises depending on the conditions chosen, by any of several criteria: The composition can be defined as an azeotrope of A and B, since the very term "azeotrope" is at once both definitive and limitative, requiring that A and B indeed form this unique composition of matter which is a constant boiling admixture. Or, the composition can be defined as a particular weight percent relationship or mole percent relationship of A:B, while recognizing that such specific values point out only one particular such relationship and that in actuality a series of such relationships represented by A:B actually exists for a given azeotrope, varied by influence of distillative conditions the temperature and pressure relationship. Or, recognizing that the azeotrope A:B does represent just such a series of relationships, the azeotropic series represented by A:B can be characterized by defining the composition as an azeotrope characterized by a boiling point at a given pressure, thus giving identifying characteristics without unduly limiting the scope of the invention by a specific numerical composition, which is limited by and is only as accurate as the analytical equipment available. The same considerations are applicable to both binary azeotropes A:B and to ternary azeotropes A:B:C.

Experimental

In each distillation run, the components were added to the still, and the constant boiling admixtures of my invention then were prepared by distilling binary or ternary admixtures until the overhead temperature reached a constant value, and the composition of the distillate remained unchanged as verified by gas-liquid chromatography analysis, thereby establishing the existence of a minimum or maximum boiling azeotrope in each case.

The still used in my studies was comprised of an Ace Glass Company No. 9219 concentric tube column about 13 inches long and about 10 mm I.D.; silvered vacuum jacket; rated 40 equilibrium distillation steps or plates at 80 cc/hr boilup rate, a vacuum jacketed head with magnetic takeoff fitted with a standard size thermometer calibrated at 0.2° C., a graduated receiver, and a 25 cc conical kettle heated by a mantle and wrapped in glass wool. The condenser was a cold-finger type cooled by dry ice/F-11. The receiver was cooled as needed to prevent reboiling. The compositions as well as the boiling points of azeotropes are sensitive to pressure. Atmospheric pressure was employed in all runs. Atmospheric pressure prevailing could not be controlled as such, but was measured frequently with a calibrated aneroid barometer graduated in mm Hg. Overhead products of the distillation were analyzed with an Aerograph 1520 gas chromatograph having a disc integrator on its recorder. The response of a thermal conductivity detector was calibrated for each azeotrope with appropriate know mixtures. In some of the determinations, constant-boiling, constant-composition overhead product was obtained with still charges having compositions straddling the "azeotrope" composition, thus confirming the azeotrope by approaching it from both sides of the distillation curve. This approach was employed particularly in cases where any constant boiling admixture appeared to be an artifact of poor rectification, although low boiling rate and high reflux rates had been used. Thus, double checks were made to assure appropriateness of the azeotropic data.

Flammability of liquids was determined by pouring about 1 ml on a cleaning cloth in a hood and igniting the cloth at that spot with a match.

Beef fat extraction was tested by putting quarter gram chunks of beef suet into 1 dram vials containing the solvent composition at room temperature. Degree and rapidity of extraction were judged visually, and by final weighing after removal of the solvent/solution and drying of the residue. The same procedure was used to test for rosin (solder) flux removal and solubility.

The compositions of my invention have applications as solvents for greases, oils, and waxes; in some cases as will be apparent from the boiling point as aerosol propellants; in cleaning or dissolving rosin solder flux; in cleaning electric motors, compressors, photographic films, oxygen storage tanks, lithographic plates, typewriters, precision instruments, gauges, and sound tapes; for cleaning of cloth, wool, hides, and the like.

I claim:

1. A substantially constant boiling admixture of (A) 1,1,2-trifluoroethane and (B) 1,1,1-trifluoro-2-chloroethane wherein said (A) represents about 53.2 weight percent, and said (B) about 46.8 weight percent, at substantially atmospheric pressure.

2. The substantially constant boiling admixture according to claim 1 further characterized by a boiling point of about 40° C. at substantially atmospheric pressure.

3. The substantially constant boiling composition according to claim 1 characterized by a boiling point of about 40° C. at about 731 mm Hg.

* * * * *